United States Patent
Konrad

(10) Patent No.: US 11,024,500 B2
(45) Date of Patent: Jun. 1, 2021

(54) LOW-PRESSURE DISCHARGE LAMP

(71) Applicant: LEDVANCE GmbH, Garching bei Munchen (DE)

(72) Inventor: Armin Konrad, Großitingen (DE)

(73) Assignee: LED VANCE GMBH, Garching bei Munchen (DE)

( * ) Notice: Subject to any disclaimer, the term of this patent is extended or adjusted under 35 U.S.C. 154(b) by 0 days.

(21) Appl. No.: 16/313,391

(22) PCT Filed: Jun. 23, 2017

(86) PCT No.: PCT/EP2017/065501
§ 371 (c)(1),
(2) Date: Dec. 26, 2018

(87) PCT Pub. No.: WO2017/220765
PCT Pub. Date: Dec. 28, 2017

(65) Prior Publication Data
US 2019/0172699 A1 Jun. 6, 2019

(30) Foreign Application Priority Data
Jun. 23, 2016 (DE) ...................... 10 2016 111 534.7

(51) Int. Cl.
| | |
|---|---|
| H01J 61/72 | (2006.01) |
| H01J 61/35 | (2006.01) |
| C09K 11/77 | (2006.01) |
| H01J 61/30 | (2006.01) |
| H01J 61/44 | (2006.01) |
| H01J 61/46 | (2006.01) |

(52) U.S. Cl.
CPC .......... H01J 61/72 (2013.01); C09K 11/7709 (2013.01); C09K 11/7777 (2013.01); H01J 61/302 (2013.01); H01J 61/35 (2013.01); H01J 61/44 (2013.01); *H01J 61/46* (2013.01)

(58) Field of Classification Search
CPC .. H01J 61/38–48; H01J 61/35; H01J 5/08–10; H01J 61/72; C09K 11/7709–7711; C09K 11/02
See application file for complete search history.

(56) References Cited

U.S. PATENT DOCUMENTS 4,459,507 A * 7/1984 Flaherty ................... H01J 61/35
                                                           313/485
5,838,100 A * 11/1998 Jansma ................ C09K 11/025
                                                           313/485
(Continued)

FOREIGN PATENT DOCUMENTS

| | | |
|---|---|---|
| DE | 102007026029 A1 | 12/2008 |
| WO | 2004013892 A2 | 2/2004 |

(Continued)

*Primary Examiner* — Mariceli Santiago
(74) *Attorney, Agent, or Firm* — Hayes Soloway PC

(57) ABSTRACT

A low-pressure discharge lamp having a discharge vessel and a coating structure. The coating structure is formed on an inner side of the discharge vessel. The coating structure has nanoscale phosphate particles and/or nanoscale functional oxide. Alternatively or in addition, the phosphate particles are free or at least approximately free of rare earth metals. The nanoscale phosphate particles range in size from 5 nm to 800 nm.

29 Claims, 3 Drawing Sheets

(56) References Cited

U.S. PATENT DOCUMENTS

| | | | |
|---|---|---|---|
| 6,281,625 B1 * | 8/2001 | Tachibana | H01J 61/35 313/489 |
| 7,696,694 B2 | 4/2010 | Vossen et al. | |
| 2001/0026122 A1 * | 10/2001 | Snijkers-Hendrickx | H01J 61/35 313/493 |
| 2003/0011310 A1 | 1/2003 | Juestel et al. | |
| 2005/0116649 A1 * | 6/2005 | Van Der Pol | H01J 61/35 313/635 |
| 2005/0218812 A1 * | 10/2005 | Van Den Brakel | H01J 61/35 313/642 |
| 2005/0242702 A1 * | 11/2005 | Justel | H01J 61/42 313/489 |
| 2008/0266861 A1 | 10/2008 | Justel et al. | |
| 2008/0297024 A1 | 12/2008 | Tuin et al. | |
| 2009/0079324 A1 * | 3/2009 | Deme | C09K 11/02 313/489 |
| 2013/0116756 A1 | 5/2013 | Juestel et al. | |
| 2017/0076933 A1 * | 3/2017 | Konrad | H01J 61/72 |

FOREIGN PATENT DOCUMENTS

| | | | |
|---|---|---|---|
| WO | 2005116164 A1 | 12/2005 | |
| WO | WO-2015132030 A1 * | 9/2015 | C09K 11/7787 |

\* cited by examiner

FIG 4

| Bonding Agent | | Emissions | | | | Emissions/g/Discharge Vessel | | | |
|---|---|---|---|---|---|---|---|---|---|
| | mg/bulb | H | O | C | Hg | H | O | C | Hg |
| Al2O3 | 93 | 1.4 | 2.0 | 0.1 | 0.8 | 1.49 | 2.15 | 0.09 | 0.87 |
| Al2O3 | 63 | 0.9 | 1.6 | 0.0 | 0.5 | 1.41 | 2.52 | 0.07 | 0.79 |
| Al2O3 | 33 | 0.6 | 1.3 | 0.0 | 0.2 | 1.94 | 3.99 | 0.08 | 0.67 |
| LaPO4 | 92 | 0.1 | 0.3 | 0.0 | 0.7 | 0.11 | 0.35 | 0.00 | 0.72 |
| LaPO4 | 64 | 0.1 | 0.3 | 0.0 | 0.9 | 0.13 | 0.50 | 0.00 | 1.45 |
| LaPO4 | 35 | 0.1 | 0.3 | 0.0 | 1.0 | 0.25 | 1.00 | 0.00 | 2.84 |

FIG 5

| Bonding Agent | | Emissions | | | | Emissions/g/Discharge Vessel | | | |
|---|---|---|---|---|---|---|---|---|---|
| | g/bulb | H | O | C | Hg | H | O | C | Hg |
| Al2O3 | 2.50 | 0.8 | 1.6 | 0.0 | 0.3 | 33.7 | 63.8 | 1.8 | 10.0 |
| Al2O3 | 2.02 | 0.7 | 1.3 | 0.0 | 0.2 | 32.7 | 62.8 | 1.8 | 9.5 |
| Al2O3 | 1.46 | 0.4 | 0.9 | 0.0 | 0.1 | 27.1 | 58.2 | 0.4 | 7.7 |
| LaPO4 | 2.51 | 0.1 | 0.6 | 0.0 | 0.3 | 4.5 | 22.5 | 0.7 | 13.0 |
| LaPO4 | 2.06 | 0.1 | 0.5 | 0.0 | 0.3 | 4.6 | 23.2 | 0.4 | 13.8 |
| LaPO4 | 1.65 | 0.1 | 0.4 | 0.0 | 0.1 | 4.4 | 23.0 | 0.0 | 4.5 |

LOW-PRESSURE DISCHARGE LAMP

CROSS-REFERENCE TO RELATED APPLICATIONS AND PRIORITY

This patent application is a U.S. National Stage of International Patent Application No. PCT/EP2017/065501 filed on Jun. 23, 2017, which claims priority from German Patent Application No. 102016111534.7 filed on Jun. 23, 2016. Each of these patent applications are herein incorporated by reference in its entirety.

TECHNICAL FIELD

The invention relates to a low-pressure discharge lamp.

BACKGROUND

Conventional low-pressure discharge lamps, for example fluorescent lamps and/or compact fluorescent lamps, have discharge vessels. Such a discharge vessel is, for example, a glass vessel and/or a discharge tube which can, for example, comprise one, two or more U-shaped, straight and/or tubular vessel regions. The discharge tube can have a coating structure on its inner sides. Furthermore, a low-pressure discharge lamp can have an electronic ballast.

The coating structure can, for example, have a protective coat directly on the discharge vessel and a fluorescent coat on the protective coat. The protective coat, for example, shields an environment of the low-pressure discharge lamp against UV radiation or, if applicable, for preventing diffusion of mercury into the glass of the discharge vessel. The protective coat can comprise gamma-$Al_2O_3$, in particular AluC, in powder form. As an alternative to this, the coating structure can have only one coat which serves as a protective coat and fluorescent coat. The fluorescent coat has fluorescent particles for converting electromagnetic radiation into colored light, wherein the colored light can be mixed so that the low-pressure discharge lamp emits white light. The fluorescent coat can for example be in powder form or can comprise a powder. In order to achieve a sufficient bond strength, the fluorescent coat can comprise gamma-aluminum oxide, in particular highly dispersed or pyrogenic aluminum oxide (AluC), for example with a typical surface area of 50 to 130 $m^2/g$, which characterizes the specific surface area of the material and is determined by means of the BET method. AluC is preferably in powder form. Typically, a proportion of AluC in the range from 1% to 5% relative to the mass of the fluorescent particles is used in order to achieve a sufficient bond strength.

The protective coat and/or the fluorescent coat can be formed in the discharge vessel, for example, by the introduction of a suspension or slurry including the protective coat and/or the fluorescent particles into the discharge tube.

In addition, a gas and a small quantity of mercury can be added to the coated discharge tube. At room temperature with the discharge lamp switched off, the mercury is partially gaseous and partially liquid in the interior of the discharge vessel and forms a small droplet. If the discharge lamp is switched on, an electric current flows through the gas in the coated discharge vessel, so that the mercury is heated, is gaseous and in the gaseous state, due to impact ionization, begins to emit the electromagnetic radiation, in particular UV radiation, by means of which the fluorescent particles are excited to emit light. The fluorescent particles can be embedded in a carrier material. The fluorescent particles can generate visible light by excitation with short-wave light up to UV radiation, for example the UV radiation of mercury.

The light phenomena are based, for example, on fluorescence or phosphorescence. The fluorescent particles can, for example, have crystalline host lattices, the lattice sites of which are partially replaced by activators. In other words, the host lattice can be doped with the activator. The activator, that is to say the doping element, determines the color of the generated light. The activators can for example comprise rare earth metals or can be formed thereby.

During the operation of the low-pressure discharge lamp, contaminants, for example water or moisture, in particular hydrogen, oxygen and/or carbon, can accumulate in the lamp atmosphere within the discharge vessel. In the event of an elevated ambient temperature, during operation of the lamp a rise in the burn voltage can take place due to the contaminants accumulated in the lamp atmosphere. The rise in the burn voltage can contribute to a reduced service life and/or to an increased probability of failure of the low-pressure discharge lamp.

It has already been recognized that the surface characteristics of the AluC determines the proportion of contaminants bound and released during the operation of the low-pressure discharge lamp. In order to minimize the contaminants, it is known to reduce the AluC proportion, but this can lead to a reduction in the bond strength of the coating structure. Furthermore, in order to minimize the contaminants it is known to maximize a temperature during an evacuation of the discharge vessel, so that already during the evacuation the contaminants have entered the lamp atmosphere and have been extracted. As before, however an increase in the contaminants is observed during operation of the lamp.

SUMMARY

In various embodiments, a low-pressure discharge lamp is provided which can be cost-effectively produced, which exhibits no rise or at least only an insignificant rise in the burn voltage at an elevated ambient temperature, in which the coating structure has a high bond strength, which has a particularly high efficiency, which has a particularly long service life and/or which has a particularly low probability of failure.

In various embodiments a low-pressure discharge lamp is provided. The low-pressure discharge lamp has a discharge vessel and a coating structure. The coating structure is formed on an inner side of the discharge vessel. The coating structure has nanoscale phosphate particles and/or nanoscale functional oxide. Alternatively or in addition to, the nanoscale phosphate particles or the nanoscale functional oxide, the coating structure comprises phosphate particles which are free or at least approximately free of rare earth metals. For example, the phosphate particles can be nanoscale and free or at least approximately free of rare earth metals.

The nanoscale phosphate particles and/or the phosphate particles which are free or at least approximately free of rare earth metals are less sorbent and/or have less affinity, in particular for water, hydrogen, hydroxides, oxygen and/or carbon. Accordingly, these phosphate particles release fewer contaminants in operation. The quantities of contaminants, such as for example H, O and/or C compounds, released in a corresponding detection test at elevated ambient temperature can be 5 to 10 times less than in known low-pressure discharge lamps. As a result, in operation the low-pressure discharge lamps can have a 10 times longer service life and a significantly lesser probability of failure. In this case the proportion of bonding agent is in the range for example from 0.25% to 5%, for example from 0.5% to 4%, for example from 0.5% to 3%, for example from 0.6% to 2.5%, based on the mass of the fluorescent substance. In this case the sufficient bond strength is maintained.

The nanoscale phosphate particles can comprise $LaPO_4$, $LaPO_4$:Ce, $YPO_4$, $YPO_4$:Ce, $GdPO_4$, or $GdPO_4$:Ce. These phosphate particles can for example have a BET surface area in a range from for example 20 $m^2/g$ to 100 $m^2/g$, for example 25 $m^2/g$ to 90 $m^2/g$, for example 30 $m^2/g$ to 80 $m^2/g$, for example 35 $m^2/g$ to 70 $m^2/g$. In principle all phosphate particles which have surface characteristics comparable with $LaPO_4$ and/or $LaPO_4$:Ce with regard to adsorption and desorption, with regard to the surface charge and/or the zeta potential and/or with regard to absorption of electromagnetic radiation in the UVA and/or UVC range, can be used as phosphate particles which are free or at least approximately free of rare earth metals.

The nanoscale functional oxide can for example have corresponding oxide particles. The nanoscale functional oxide can for example comprise $Y_2O_3$, $Gd_2O_3$ or YZrO.

The low-pressure discharge lamp can, for example, be a mercury low-pressure discharge lamp. The low-pressure discharge lamp can for example have a base at one end or at both ends.

In various embodiments, the nanoscale phosphate particles have a mean particle size in a range from 5 nm to 800 nm, for example in a range from 10 nm to 650 nm, for example in a range from 20 nm to 200 nm. Thus, the fact that the phosphate particles are nanoscale means that the corresponding particles have a mean particle size in a range from 5 nm to 800 nm, for example in a range from 10 nm to 650 nm, for example in a range from 20 nm to 200 nm.

In various embodiments, a proportion of rare earth metals in the phosphate particles is less than 500 ppm, for example less than 50 ppm, for example less than 5 ppm. Thus, the fact that the phosphate particles are at least approximately free of rare earth metals can, for example, mean that the proportion thereof in the corresponding phosphate particles is less than 500 ppm, for example less than 50 ppm, for example less than 5 ppm. The proportion can for example correspond to be a proportion in percentage terms and/or can correspond to a degree of doping.

In various embodiments, the phosphate particles are nanoscale and are free, or at least approximately free, of rare earth metals.

In various embodiments, the coating structure has fluorescent particles and the mean particle size of the phosphate particles is smaller by a factor of 10 to 50 than the mean particle size of the fluorescent particles. The fluorescent particles can, for example, have a mean particle size of 3 to 10 μm.

In various embodiments, the coating structure has a protective coat which is formed on an inner side of the discharge tube, and a fluorescent coat which is formed on the protective coat and comprises the fluorescent particles. The protective coat shields the UV radiation generated in the low-pressure discharge lamp relative to an environment of the low-pressure discharge lamp and serves as a carrier for the fluorescent coat. As an alternative to this, the coating structure can have only one coat which serves as a protective coat and fluorescent coat and which is formed, for example, as a protective coat comprising fluorescent particles. As an alternative to this, the coating structure can have more than two, for example three, four, or more coats. These additional layers can be for example further fluorescent coats and/or further protective coats. The nanoscale phosphate particles and/or the phosphate particles which are, for example, free or approximately free of rare earth metals can be used, for example, as bonding agent in the fluorescent coat and/or in the protective coat.

In various embodiments, the protective coat comprises the phosphate particles. Alternatively or in addition, the phosphate particles in the coating structure act as bonding agent for example in the fluorescent coat and/or in the protective coat.

In various embodiments, the coating structure preferably has a layer which comprises the phosphate particles and fluorescent particles or is formed therefrom.

In various embodiments, the phosphate particles comprise lanthanum phosphate.

In various embodiments, the low-pressure discharge lamp in operation emits white light.

In various embodiments, the nanoscale functional oxide is not doped, and/or the nanoscale phosphates are doped.

BRIEF DESCRIPTION OF THE DRAWINGS

Embodiments of the invention are illustrated in the drawings and are explained in greater detail below.

FIG. 4 shows a first table; and

FIG. 5 shows a second table.

DETAILED DESCRIPTION OF THE DRAWINGS

Figure 1:
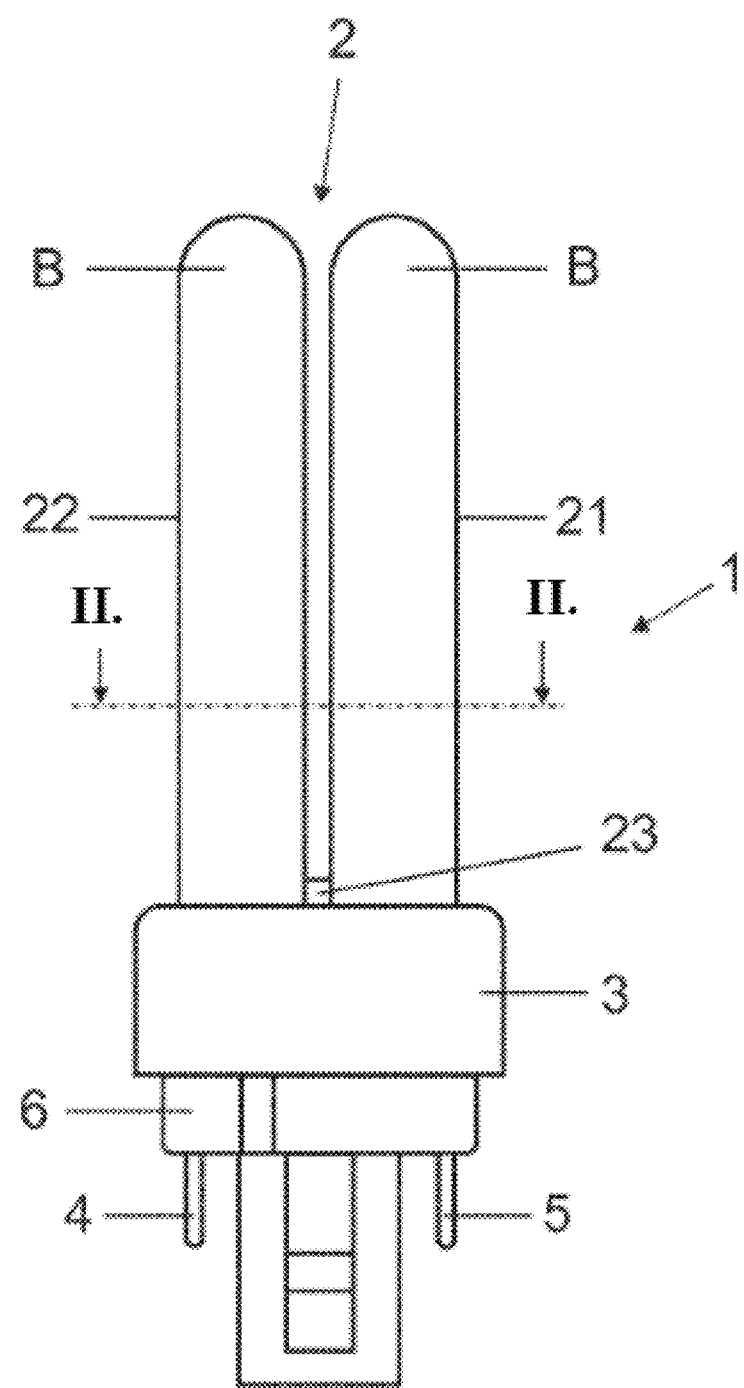
FIG. 1 shows a side view of an embodiment of a low-pressure discharge lamp.

In the following detailed description reference is made to the appended drawings which form part of this description and in which for illustration specific exemplary embodiments are shown in which the invention can be implemented. In this respect terminology relating to direction, such as for instance "top", "bottom", "in front", "at the rear", "front", "rear", etc. is used relative to the orientation of the described drawing(s). Since components of exemplary embodiments can be positioned in a number of different orientations, the terminology relating to direction serves for illustration and is in no way restrictive. It will be understood that other exemplary embodiments can be used and structural or logical changes can be carried out without deviating from the scope of protection of the present invention. It will be understood that the features of the various exemplary embodiments described here can be combined with one another, unless specifically stated otherwise. Therefore the following detailed description should not be interpreted in a restrictive sense, and the scope of protection of the present invention is defined by the attached claims.

Within the context of this description the terms "joined", "connected" as well as "coupled" are used to describe both a direct and also an indirect joining, a direct or indirect connection as well as a direct or indirect coupling. In the drawings identical or similar elements are provided with identical reference numerals, in so far as this is advantageous.

FIG. 1 shows a low-pressure discharge lamp 1 which has a discharge vessel 2 and a housing 3. The low-pressure discharge lamp 1 can be, for example, a fluorescent lamp, an energy-saving lamp and/or a compact fluorescent lamp. The discharge vessel 2 can comprise for example glass, for example soda-lime glass, or can be made therefrom. The discharge vessel 2 can also be designated as a pressure discharge vessel, light bulb, discharge tube, gas discharge tube or as a burner. The discharge vessel 2 has, for example, two vessel parts 21 and 22 which are U-shaped per se and are tubular in cross-section, which are connected by a cross-piece 23 and as a result form a cohesive discharge space. The two vessel parts 21 and 22 extend with their free ends into the housing 3, in which optionally an electronic ballast (not illustrated) can be arranged. As an alternative to this, the discharge vessel 2 can be rod-shaped and/or straight, that is to say without curvature, and/or can have two housings 3, for example one at each end of the rod shape.

The housing 3 has a base 6 and a cover 8. The low-pressure discharge lamp 1 can be designated as a low-pressure discharge lamp 1 having a base at one end. Contact pins 4 and 5 project from the base 6 for supplying the discharge lamp 1 with electric current and/or for controlling the discharge lamp 1 externally. On the upper part-regions of the discharge vessel 2 shown in FIG. 1 the vessel parts 21 are arcuate. In the arcuate part-regions of the vessel parts 21, 22 cross-sections B of the vessel parts 21, 22 correspond substantially to the cross-sections which the vessel parts 21 and 22 have outside these arcuate part-regions, for example the cross-sections in the region of the section line II. The discharge vessel 2 can be fastened to the housing 3 by means of a cement (not shown). For example, the discharge vessel 2 can be fastened to the base 6 and/or the cover 8. If the discharge vessel 2 is rectilinear, it can have two bases 6, in particular one base 6 at each end, and the corresponding low-pressure discharge lamp 1 can be designated as a low-pressure discharge lamp 1 with bases at two ends.

Figure 2:
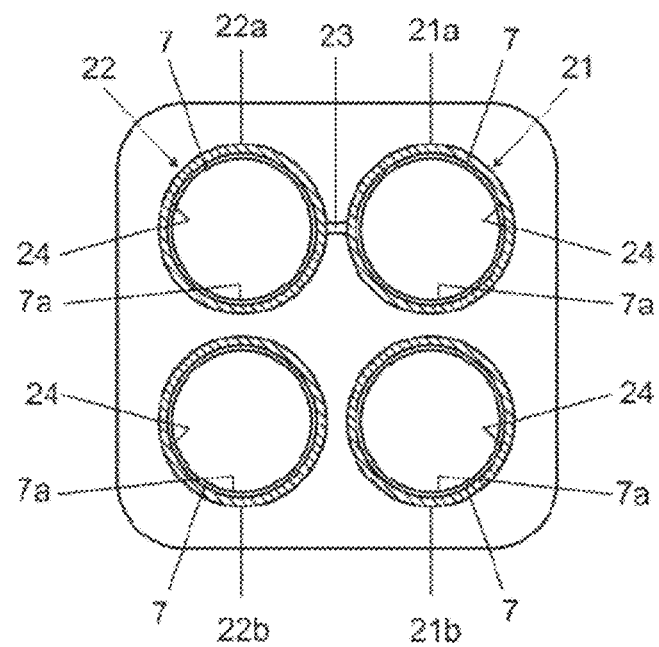
FIG. 2 shows a sectional representation of the low-pressure discharge lamp according to FIG. 1.

FIG. 2 shows a sectional representation of the discharge lamp 1 according to the section line II in FIG. 1. The sectional representation shows two tube portions 21a, 21b of the vessel part 21 and two tube portions 22a, 22b of the vessel part 22. The vessel parts 21, 22 have inner sides 24 of the discharge vessel 2. A coating structure 7 is formed on the inner sides 24 of the discharge vessel 2 and thus on the inner sides 24 of the vessel parts 21, 22 and thus also on the inner sides 24 of the tube portions 21a, 21b, 22a, 22b. The discharge vessel 2 with the coating structure 7 can be designated as a coated discharge vessel 2. A lamp length of the low-pressure discharge lamp 1 corresponds to a sum of the lengths of the vessel parts 21, 22 of the low-pressure discharge lamp 1. The length of the vessel parts 21, 22 of the low-pressure discharge lamp 1 in each case correspond to the sum of the lengths of the corresponding straight tube portions 21a, 21b, 22a, 22b and of the corresponding curved tube portion which connects the corresponding straight tube portions 21a, 21b, 22a, 22b.

In the discharge vessel 2 there is a gas, for example a noble gas, which in operation serves as an electron conductor and/or an electron buffer. Argon or krypton can be used, for example, as the gas. Furthermore, optionally smaller quantities of one, two or more further gases can be present in the discharge vessel 2. The gas can for example have a pressure between 1.5 hPa and 3 hPa, for example approximately 2 hPa.

Figure 3:
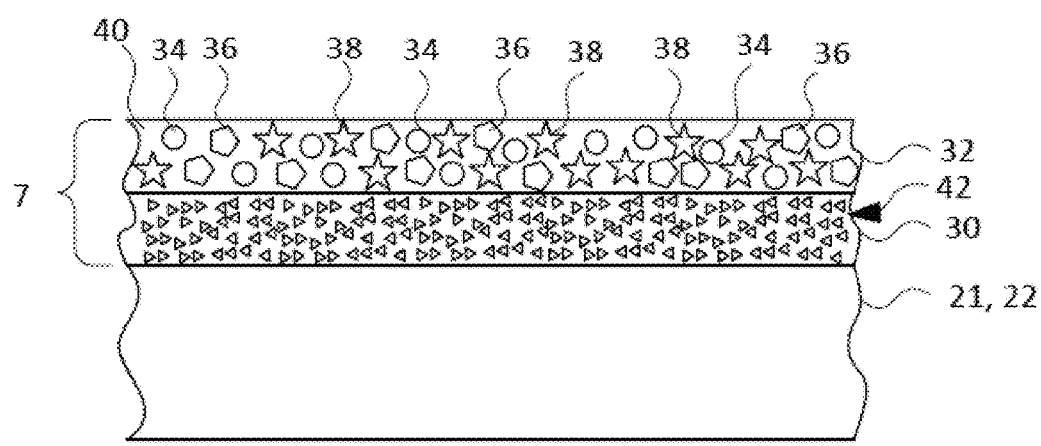
FIG. 3 shows a detailed sectional representation of an embodiment of a discharge vessel of a low-pressure discharge lamp.

FIG. 3 shows a detailed sectional representation of an embodiment of a discharge vessel 2, in particular vessel parts 21, 22 of the discharge vessel 2. The discharge vessel 2 can, for example, be the discharge vessel 2 explained above. The vessel parts 21, 22 can for example have a wall thickness between 0.1 mm and 2 mm, for example between 0.2 mm and 0.8 mm.

The coating structure 7 has, for example, a protective coating 30 and a fluorescent coating 32. The protective coat 30 is, for example, formed directly on the inner sides 24 of the vessel parts 21, 22. The fluorescent coat 32 is, for example, formed directly on the inner protective coat 30. The fluorescent coat 32, for example, comprises fluorescent particles 34 which emit green light, fluorescent particles 36 which emit red light and fluorescent particles 38 which emit blue light. As an alternative to this, the coating structure can comprise only one coat which serves as a protective coat 30 and fluorescent coat 32 and which is formed for example as a coat 30 comprising fluorescent particles 34, 36, 38. As an alternative to this, the coating structure can have more than two, for example three, four or more coats. These additional coats can be, for example, further fluorescent coats 32 and/or further protective coats 30.

The fluorescent particles 34, 36, 38, can, for example, be embedded and/or incorporated in a carrier material 40 or can be part of a fluorescent substance mixture. The carrier material 40 can for example comprise or be a bonding agent. The fluorescent particles 34, 36, 38 can in each case be crystalline and can each comprise host lattices. The host lattices can for example comprise yttrium oxide or can be formed therefrom. The fluorescent particles 34, 36, 38 comprise activators which are incorporated into the corresponding host lattices. For example, the fluorescent substances 34, 36, 38 and, in particular, the host lattices are doped with the activators. The activators, for example, comprise rare earth metals. The activators for example comprise cerium, europium and/or terbium. For example, the host lattices can be doped with $Eu_2O_3$ and/or $Tb_2O_3$ and then comprise europium or terbium. The fluorescent particles 34 which emit red light can be for example $Y_2O_3$:Eu particles. The fluorescent particles 36 which emit green light can be for example $LaPO_4$:Ce,Tb particles or $LaPO_4$:Tb, referred to below as LAP particles, or $CeMgAl_{11}O_{19}$:Tb, designated below as CAT particles. The fluorescent particles 38 which emit blue light can be for example, $BaMgAl_{10}O_{17}$:Eu, designated below as BAM particles. The fluorescent particles 34, 36, 38 can, for example, have a mean particle size of 3 to 10 μm.

The coating structure 7, in particular the fluorescent coat 32 and/or the protective coat 30, comprises phosphate particles 42 which are nanoscale and/or are free or at least approximately free of rare earth metals. For example, the phosphate particles 42 can be nanoscale and free or at least approximately free of rare earth metals. Alternatively or in addition, the coating structure 7, in particular the fluorescent coat 32 and/or the protective coat 30, comprises nanoscale functional oxide. The phosphate particles 42 are merely slightly sorbent and/or have an affinity for contaminants, in particular for water, hydrogen, hydroxides, oxygen and/or carbon. Accordingly, these phosphate particles 42 in operation of the low-pressure discharge lamp 1 release few, for example insignificantly few contaminants. The phosphate particles 42 can serve as bonding agent and/or bonding promoter in the coat in which they are arranged. The proportion of bonding agent, for example, in the fluorescent coat 32 can be in the range from 0.25% to 5%, for example from 0.5% to 4%, for example from 0.5% to 3%, for example from 0.6% to 2.5%, based on the mass of the fluorescent particles 34, 36, 38.

The phosphate particles 42 can comprise, for example, $LaPO_4$, $LaPO_4$:Ce, $YPO_4$, $YPO_4$:Ce, $GdPO_4$, or $GdPO_4$:Ce. The phosphate particles 42 can comprise, for example, a BET surface area in a range from for example 20 m$^2$/g to 100 m$^2$/g, for example 25 m$^2$/g to 90 m$^2$/g, for example 30 m$^2$/g to 80 m²/g, for example 35 m²/g to 70 m²/g. The phosphate particles 42 can, for example, have surface characteristics comparable with $LaPO_4$ and/or $LaPO_4:Ce$ with regard to adsorption and desorption, with regard to the surface charge and/or the zeta potential and/or with regard to absorption of electromagnetic radiation in the UVA and/or UVC range. One of the phosphate particles 42 can have for example one, two, three or more molecules of the corresponding phosphate. The mean particle size of the phosphate particles 42 can be smaller by a factor of 10 to 50 than the mean particle size of the fluorescent particles.

The nanoscale phosphate particles 42 have a mean particle size in a range from 5 nm to 800 nm, for example in a range from 10 nm to 650 nm, for example in a range from 20 nm to 200 nm. Thus, the fact that the phosphate particles are nanoscale can mean that the corresponding phosphate particles have a mean particle size in a range from 5 nm to 800 nm, for example in a range from 10 nm to 650 nm, for example in a range from 20 nm to 200 nm.

Alternatively or in addition to the nanoscale form of the phosphate particles 42, a proportion of rare earth metals in the phosphate particles 42 is less than 500 ppm, for example less than 50 ppm, for example less than 5 ppm. Thus, the fact that the phosphate particles 42 are at least approximately free of rare earth metals can, for example, mean that the proportion thereof in the corresponding phosphate particles 42 is less than 500 ppm, for example less than 50 ppm, for example less than 5 ppm. The proportion can, for example, correspond to be a proportion in percentage terms and/or can correspond to a degree of doping.

Optionally, the coating structure 7 can comprise only one coat which serves as a protective coat 30 and fluorescent coat 32 and which is formed for example as a protective coat 30 comprising fluorescent particles 34, 36, 38. As an alternative to this, the coating structure 7 can have more than two, for example three, four or more coats. These additional coats can be, for example, further fluorescent coats 32 and/or further protective coats 30. The phosphate particles 42 can be used, for example, as bonding agent in the fluorescent coat 32 and/or in the protective coat 30. Optionally the protective coat 30 can be formed by the phosphate particles 42.

On an upper side 7a and/or in the fluorescent coat 7 particles can be located which, because of their small size, are not visible or not included in the drawings, and which, for example, can contribute to a maximum luminous flux being achieved quickly in operation and/or a luminous flux start-up is particularly short. Additionally, a small quantity of mercury can be located in the discharge vessel 2, for example 1 mg mercury or less, wherein in the switched-off state of the discharge lamp 1 for example the mercury is partially liquid and gaseous and in the switched-on state with maximum luminous flux the mercury is liquid to a lesser extent and gaseous to a greater extent. The mercury can combine with the particles on the surface 7a of the fluorescent coat 7 and, for example, can form an amalgam with particles comprising indium. The particles are, for example, metal particles and/or serve to bind mercury. For example, the metal particles comprise indium, tin, titanium, zinc, silver, gold, bismuth, aluminum, or copper. The particles can, for example, have a mean particle size between 50 and 2000 nm, between 100 and 500 nm or between 200 and 300 nm.

The protective coat 30 can, for example, comprise aluminum oxide and highly dispersed aluminum oxide, for example, pyrogenic aluminum oxide (AluC). For example, the protective coat 30 can comprise 50%-95%, for example approximately 70%, aluminum oxide and 5% to 50%, for example approximately 30% AluC.

The coating structure 7, in particular the fluorescent coat 30 and/or the protective coat 32, can be formed, for example, by means of washing with an aqueous suspension. The aqueous suspension can comprise the fluorescent particles 34, 36, 38 or the material for the protective coat 30. After application of the aqueous suspension to the inner walls 24 it can be dried by heating, wherein the proportion of water is completely or at least predominantly evaporated. The slurred discharge vessel 2 can be heated to temperatures for example from 500° C. to 800° C., for example from 520° C. to 650° C., for example from 530° C. to 600° C. The protective coat 30 and the fluorescent coat 32 can be formed, for example, in two successive procedures.

In operation of the discharge lamp 2 a voltage is applied to the contact pins 4, 5 of the discharge vessel 2. As a result, an electric current flows through the gas in the discharge vessel 2 and the mercury is heated. As a result, the bound mercury distributed over the surface 7a of the fluorescent coat 7 is quickly converted into its gas phase. The gaseous mercury atoms or molecules are excited by the electrical power of the electric current and by means of the discharge vessel 2 emit uniformly distributed UV radiation, for example at a wavelength of 254 nm. The UV radiation excites the fluorescent particles 34, 36, 38 in the fluorescent coat 32 to emit light. For example, the fluorescent particles 34, 36, 38 can emit red, green, or blue light, so that, for example, white light can be generated. The light yield or efficiency of the low-pressure discharge lamp 1 can be in a range for example from 70 lm/W to 120 lm/W, for example from 80 lm/W to 110 lm/W, for example from 85 lm/W to 100 lm/W. The generated light can for example have a color temperature from 2,500 K to 8,000 K, for example from 2,600 K to 6,500 K, for example from 2,700 K to 4,500 K.

FIG. 4 shows a first table, which shows emissions of contaminants during operation of a conventional low-pressure discharge lamp and of an exemplary embodiment of a low-pressure discharge lamp 1, for example the low-pressure discharge lamp 1 described above. The conventional low-pressure discharge lamp has a coating structure with only one coat and the one coat is formed by the bonding agent $Al_2O_3$. The exemplary embodiment of the low-pressure discharge lamp 1 has a coating structure 7 with only one coat and the coating structure 7 is formed by the bonding agent $LaPO_4$.

In the first three lines of the first table the emissions of contaminants of the conventional low-pressure discharge lamp are respectively 93 mg $Al_2O_3$ per discharge vessel (mg/bulb), 63 mg $Al_2O_3$ per discharge vessel (mg/bulb) or 33 mg $Al_2O_3$ per discharge vessel (mg/bulb). In the fourth to sixth lines of the first table the emissions of contaminants of the conventional low-pressure discharge lamp 1 are respectively 93 mg $LaPO_4$ per discharge vessel (mg/bulb), 63 mg $LaPO_4$ per discharge vessel (mg/bulb) or 33 mg $LaPO_4$ per discharge vessel (mg/bulb).

The contaminants are listed in the columns of the first table and comprise hydrogen, oxygen and carbon. In the central block of columns the quantity of contaminants are given relatively and without units and in the right-hand block of columns they are given per gram of coat weight per discharge vessel (g/bulb). The right-hand block is obtained from the quotient of the left-hand block and the mass per bulb. The result is scaled with the factor 100.

It can be seen from the first table that the emission of contaminants in the exemplary embodiment of the low-pressure discharge lamp 1 is significantly smaller, for example by ten times and more, than in the conventional low-pressure discharge lamp 1.

FIG. 5 shows a second table, which shows emissions of contaminants during operation of a conventional low-pressure discharge lamp and of an exemplary embodiment of a low-pressure discharge lamp 1, for example the low-pressure discharge lamp 1 described above. The conventional low-pressure discharge lamp has a coating structure with at least one fluorescent coat which comprises 2% by weight of the bonding agent $Al_2O_3$. The exemplary embodiment of the low-pressure discharge lamp 1 has a coating structure 7 with at least one fluorescent coat 32 which comprises 2% by weight of the bonding agent $LaPO_4$.

In the first three lines of the second table the emissions of contaminants of the conventional low-pressure discharge lamp are respectively 2.50 g coat weight with $Al_2O_3$ bonding agent per discharge vessel (g/bulb), 2.02 g coat weight with $Al_2O_3$ bonding agent per discharge vessel (g/bulb) or 1.46 g coat weight with $Al_2O_3$ bonding agent per discharge vessel (g/bulb). In the fourth to sixth lines of the second table the emissions of contaminants of the exemplary embodiment of the low-pressure discharge lamp 1 are respectively 2.51 g coat weight with $LaPO_4$ bonding agent per discharge vessel (g/bulb), 2.06 g coat weight with $LaPO_4$ bonding agent per discharge vessel (g/bulb) or 1.65 g coat weight with $LaPO_4$ bonding agent per discharge vessel (g/bulb).

The contaminants are listed in the columns of the second table and comprise hydrogen, oxygen and carbon. In the central block of columns, the quantity of contaminants are given relatively and without units and in the right-hand block of columns they are given per gram of coat weight per discharge vessel (g/bulb).

It can be seen from the second table that the emission of contaminants in the exemplary embodiment of the low-pressure discharge lamp 1 is significantly smaller, for example by ten times and more, than in the conventional low-pressure discharge lamp 1.

The invention is not limited to the exemplary embodiments given. For example, the low-pressure discharge lamp 1 can have a straight shape and/or more or fewer vessel parts 21, 22 and/or more or fewer tube portions 21*a*, 21*b*, 22*a*, 22*b*. Furthermore, the fluorescent particles 34, 36, 38 can be formed of different chemical elements than those referred to above.

LIST OF REFERENCES

1 low-pressure discharge lamp
2 discharge vessel
3 housing
4, 5 contact pins
6 base
7 coating structure
7*a* surface
8 cover
21, 22 vessel parts
23 cross-piece
21*a*, 21*b*, 22*a*, 22*b* tube portions
24 inner sides
30 protective coat
32 fluorescent coat
34 fluorescent particles emitting green light
36 fluorescent particles emitting red light
38 fluorescent particles emitting blue light
40 carrier material
42 phosphate particles

The invention claimed is:

1. A low-pressure discharge lamp comprising:
a discharge vessel; and
a coating structure disposed on an inner side of the discharge vessel, wherein the coating structure comprises:
a first coating layer disposed on the inner side of the discharge vessel, wherein the first coating layer comprises:
50-95% aluminum oxide; and
5-50% pyrogenic aluminum oxide; and
a second coating layer disposed on the first coating layer, wherein the second coating layer comprises fluorescent particles;
wherein the first coating layer further comprises at least one of:
nanoscale phosphate particles; and
nanoscale functional oxide.

2. The low-pressure discharge lamp of claim 1, wherein the first coating layer comprises nanoscale phosphate particles but not nanoscale functional oxide.

3. The low-pressure discharge lamp of claim 1, wherein the first coating layer comprises nanoscale functional oxide but not nanoscale phosphate particles.

4. The low-pressure discharge lamp of claim 1, wherein the first coating layer comprises both nanoscale phosphate particles and nanoscale functional oxide.

5. The low-pressure discharge lamp of claim 1, wherein the second coating layer further comprises nanoscale phosphate particles but not nanoscale functional oxide.

6. The low-pressure discharge lamp of claim 1, wherein the second coating layer further comprises nanoscale functional oxide but not nanoscale phosphate particles.

7. The low-pressure discharge lamp of claim 1, wherein the second coating layer further comprises both nanoscale phosphate particles and nanoscale functional oxide.

8. The low-pressure discharge lamp of claim 1, wherein both the first coating layer and the second coating layer comprise nanoscale phosphate particles but not nanoscale functional oxide.

9. The low-pressure discharge lamp of claim 1, wherein both the first coating layer and the second coating layer comprise nanoscale functional oxide but not nanoscale phosphate particles.

10. The low-pressure discharge lamp of claim 1, wherein both the first coating layer and the second coating layer comprise both nanoscale phosphate particles and nanoscale functional oxide.

11. The low-pressure discharge lamp of claim 1, wherein the first coating layer comprises:
approximately 70% aluminum oxide; and
approximately 30% pyrogenic aluminum oxide.

12. The low-pressure discharge lamp of claim 1, wherein at least one of:
the fluorescent particles have a mean particle size in the range of 3-10 μm; and
a mean particle size of the nanoscale phosphate particles is smaller than a mean particle size of the fluorescent particles by a factor in the range of 10-50.

13. The low-pressure discharge lamp of claim 1, wherein:
the second coating layer further comprises a carrier material comprising a bonding agent; and
the fluorescent particles are at least one of embedded in and incorporated in the carrier material.

14. The low-pressure discharge lamp of claim 1, wherein the fluorescent particles at least one of:
  comprise or are formed from yttrium oxide ($Y_2O_3$); and
  are doped with a rare earth metal activator comprising at least one of cerium (Ce), europium (Eu), and terbium (Tb).

15. The low-pressure discharge lamp of claim 1, wherein at least one of:
  the nanoscale phosphate particles comprise at least one of lanthanum phosphate ($LaPO_4$), cerium-doped lanthanum phosphate ($LaPO_4$:Ce), yttrium phosphate ($YPO_4$), cerium-doped yttrium phosphate ($YPO_4$:Ce), gadolinium phosphate ($GdPO_4$), and cerium-doped gadolinium phosphate ($GdPO_4$:Ce); and
  the nanoscale functional oxide comprises at least one of yttrium oxide ($Y_2O_3$), gadolinium oxide ($Gd_2O_3$), and yttrium zirconium oxide (YZrO).

16. The low-pressure discharge lamp of claim 1, wherein the nanoscale phosphate particles have a mean particle size in the range of 5-800 nm.

17. The low-pressure discharge lamp of claim 1, wherein a proportion of rare earth metals in the nanoscale phosphate particles is less than 500 ppm.

18. The low-pressure discharge lamp of claim 1, wherein:
  the second coating layer further comprises nanoscale phosphate particles; and
  a proportion of the nanoscale phosphate particles in the second coating layer is in the range of 0.25-5%.

19. The low-pressure discharge lamp of claim 1, wherein:
  the nanoscale phosphate particles are doped; and
  the nanoscale functional oxide is not doped.

20. The low-pressure discharge lamp of claim 1, wherein the coating structure comprises a third coating layer disposed on the second coating layer, wherein the third coating layer comprises at least one of fluorescent particles, nanoscale phosphate particles, and nanoscale functional oxide.

21. A low-pressure discharge lamp comprising:
  a discharge vessel; and
  a coating structure disposed directly on an inner side of the discharge vessel, wherein the coating structure consists of one coating layer which comprises:
    50-95% aluminum oxide;
    5-50% pyrogenic aluminum oxide; and
    fluorescent particles;
    wherein the coating layer either:
      further comprises nanoscale phosphate particles but not nanoscale functional oxide; or
      further comprises nanoscale functional oxide but not nanoscale phosphate particle;
    wherein at least one of:
      the nanoscale phosphate particles have a mean particle size in the range of 5-800 nm; and
      a proportion of rare earth metals in the nanoscale phosphate particles is less than 500 ppm.

22. The low-pressure discharge lamp of claim 21, wherein the coating layer comprises:
  approximately 70% aluminum oxide; and
  approximately 30% pyrogenic aluminum oxide.

23. The low-pressure discharge lamp of claim 21, wherein at least one of:
  the fluorescent particles have a mean particle size in the range of 3-10 μm; and
  a mean particle size of the nanoscale phosphate particles is smaller than a mean particle size of the fluorescent particles by a factor in the range of 10-50.

24. The low-pressure discharge lamp of claim 21, wherein the fluorescent particles at least one of:
  comprise or are formed from yttrium oxide ($Y_2O_3$); and
  are doped with a rare earth metal activator comprising at least one of cerium (Ce), europium (Eu), and terbium (Tb).

25. The low-pressure discharge lamp of claim 21, wherein at least one of:
  the nanoscale phosphate particles comprise at least one of lanthanum phosphate ($LaPO_4$), cerium-doped lanthanum phosphate ($LaPO_4$:Ce), yttrium phosphate ($YPO_4$), cerium-doped yttrium phosphate ($YPO_4$:Ce), gadolinium phosphate ($GdPO_4$), and cerium-doped gadolinium phosphate ($GdPO_4$:Ce); and
  the nanoscale functional oxide comprises at least one of yttrium oxide ($Y_2O_3$), gadolinium oxide ($Gd_2O_3$), and yttrium zirconium oxide (YZrO).

26. The low-pressure discharge lamp of claim 21, wherein:
  the nanoscale phosphate particles are doped; and
  the nanoscale functional oxide is not doped.

27. A low-pressure discharge lamp comprising:
  a discharge vessel; and
  a coating structure disposed on an inner side of the discharge vessel, wherein the coating structure comprises:
    a first coating layer disposed on the inner side of the discharge vessel, wherein the first coating layer comprises:
      50-95% aluminum oxide; and
      5-50% pyrogenic aluminum oxide; and
    a second coating layer disposed on the first coating layer, wherein the second coating layer comprises fluorescent particles;
  wherein the second coating layer either:
    comprises nanoscale phosphate particles but not nanoscale functional oxide, wherein at least one of:
      the nanoscale phosphate particles have a mean particle size in the range of 5-800 nm; and
      a proportion of rare earth metals in the nanoscale phosphate particles is less than 500 ppm; or
    comprises nanoscale functional oxide but not nanoscale phosphate particles.

28. A low-pressure discharge lamp comprising:
  a discharge vessel; and
  a coating structure disposed on an inner side of the discharge vessel, wherein the coating structure comprises:
    a first coating layer disposed on the inner side of the discharge vessel, wherein the first coating layer comprises:
      50-95% aluminum oxide; and
      5-50% pyrogenic aluminum oxide; and
    a second coating layer disposed on the first coating layer, wherein the second coating layer comprises fluorescent particles;
  wherein at least one of the first coating layer and the second coating layer further comprises at least one of:
    nanoscale phosphate particles, wherein the nanoscale phosphate particles are doped, and wherein at least one of:
      the nanoscale phosphate particles have a mean particle size in the range of 5-800 nm; and
      a proportion of rare earth metals in the nanoscale phosphate particles is less than 500 ppm; and
    nanoscale functional oxide, wherein the nanoscale functional oxide is not doped.

29. A low-pressure discharge lamp comprising:
a discharge vessel; and
a coating structure disposed directly on an inner side of the discharge vessel, wherein the coating structure consists of one coating layer which comprises:
50-95% aluminum oxide;
5-50% pyrogenic aluminum oxide;
fluorescent particles; and
at least one of:
   nanoscale phosphate particles, wherein the nanoscale phosphate particles are doped; and
   nanoscale functional oxide, wherein the nanoscale functional oxide is not doped;
wherein at least one of:
   the nanoscale phosphate particles have a mean particle size in the range of 5-800 nm; and
   a proportion of rare earth metals in the nanoscale phosphate particles is less than 500 ppm.

* * * * *